United States Patent
Alhof et al.

(10) Patent No.: US 10,232,694 B2
(45) Date of Patent: Mar. 19, 2019

(54) VEHICLE DOOR

(71) Applicant: GM GLOBAL TECHNOLOGY OPERATIONS LLC, Detroit, MI (US)

(72) Inventors: Michael Alhof, Ruesselsheim (DE); Erol Mori, Ruesselsheim (DE); Michael Horneck, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/423,223

(22) Filed: Feb. 2, 2017

(65) Prior Publication Data

US 2017/0225556 A1 Aug. 10, 2017

(30) Foreign Application Priority Data

Feb. 4, 2016 (DE) .................. 10 2016 001 243

(51) Int. Cl.
| | |
|---|---|
| *B60J 10/88* | (2016.01) |
| *B60J 5/04* | (2006.01) |
| *B60J 10/75* | (2016.01) |

(52) U.S. Cl.
CPC ............. *B60J 10/88* (2016.02); *B60J 5/0411* (2013.01); *B60J 10/75* (2016.02)

(58) Field of Classification Search
CPC ........... B60J 10/88; B60J 10/75; B60J 5/0411
USPC .................................................. 296/146.2
See application file for complete search history.

(56) References Cited

U.S. PATENT DOCUMENTS

| | | | |
|---|---|---|---|
| 5,970,659 | A | 10/1999 | Van Den Oord |
| 7,900,993 | B2 * | 3/2011 | Suzuki .................... B60R 13/04 296/146.2 |
| 2005/0198908 | A1 | 9/2005 | Imaizumi et al. |
| 2010/0313487 | A1 | 12/2010 | Ellis et al. |
| 2013/0305611 | A1 * | 11/2013 | Wende ...................... E06B 7/22 49/483.1 |

FOREIGN PATENT DOCUMENTS

| | | |
|---|---|---|
| DE | 102005022152 A1 | 11/2006 |
| DE | 102009014202 A1 | 10/2010 |
| DE | 102011089066 A1 | 6/2013 |
| EP | 1253035 | 10/2002 |
| JP | 2005254984 A | 9/2005 |
| JP | 2013082408 A | 5/2013 |
| WO | 2011135220 A1 | 11/2011 |

OTHER PUBLICATIONS

Great Britain Patent Office, Great Britain Search Report for Great Britain Application No. GB1701373.1, dated Jul. 13, 2017.
German Patent Office, German Search Report for German Application No: 10 2016 001 243.9 dated Aug. 17, 2016.

\* cited by examiner

*Primary Examiner* — Joseph D. Pape
*Assistant Examiner* — Dana D Ivey
(74) *Attorney, Agent, or Firm* — Lorenz & Kopf, LLP

(57) ABSTRACT

A vehicle door includes a door outer skin that delimits a window opening at the bottom, a pillar that delimits the window opening at the side, and a channel strip. A top edge of the door outer skin and a hook protruding from pillar are inserted in a groove in the channel strip.

15 Claims, 2 Drawing Sheets

VEHICLE DOOR

CROSS-REFERENCE TO RELATED APPLICATION

This application claims priority to German Patent Application No. 102016001243, filed Feb. 4, 2016, which is incorporated herein by reference in its entirety.

TECHNICAL FIELD

The present disclosure pertains to a door for a vehicle, particularly for a motor vehicle, and specifically the assembly of a door along a shoulder line at which an outer skin of a lower part of the door and a window opening in the upper part border each other.

BACKGROUND

The conventional method for preventing water and dirt from getting into the interior of the door through a gap between a window pane fitted in the window opening and the outer skin is to place a "channel strip" over a top edge of the outer skin. The channel strip lies against the window pane and the outer skin as a flexible seal. For design reasons, it is desirable that the channel strip extend not only along the bottom edge of the window opening, but also over the entire length of the door, including of the pillars next to the window opening.

By way of example, DE 10 2005 022 152 A1 discloses a vehicle door with a channel strip applied over the top edge of the door outer skin. In order to create the top edge, a metal panel of the door outer skin is provided with a surrounding border element around an inner part of the door, so that a border strip of the outer skin is folded downwards on a side of the inner part facing towards the interior of the vehicle, and a bottom edge of the border strip which protrudes slightly from the inner part forms a shoulder on which the applied channel strip engages.

Such an engagement is practicable along the bottom edge of the window opening; however, the flanging operation that is needed to form the shoulder cannot be carried out beyond the ends of this bottom edge, because the space needed by the tools that are used for this purpose is occupied by pillars that delimit the window.

SUMMARY

Accordingly, the present disclosure is directed to a vehicle door in which a continuous, secure anchoring of the channel strip is possible over the entire length of the door.

According to one aspect of the present disclosure, a vehicle door includes a door outer skin that delimits the lower edge of a window opening, a pillar delimits the window opening laterally and a channel strip, by inserting a top edge of the door outer skin and a hook protruding slightly from the pillar in a groove in the channel strip. If the pillar includes a supporting center part, typically including metal profiles, and a vertically elongated panel which is attached to the center part and conceals it in the fitted state, the hook is expediently able to protrude from the panel.

The hook may be molded from plastic; this makes it easier to adapt the wall thickness thereof to that of the top edge of the door outer skin, so that a uniform clamped fit for the channel strip is assured over the entire length of the groove, both at the top edge and at the hook. The hook may be formed integrally with the panel particularly if the panel is itself a plastic molded part. The hook and the top edge may engage in consecutive sections of the groove in the longitudinal direction of the groove.

In order to form the top edge, a top edge of the door outer skin may surround a door inner part. In corresponding manner, the door outer skin may extend around a front wall of the door along a side edge. Since the top and side edges surround two different components of the door, they cannot transition into each other seamlessly, instead there must be a gap between the two, and it is in this gap that the channel strip is secured to the hook.

The wall thickness of the hook should be greater than the wall thickness of the top edge of the door outer skin at least locally, to ensure that the ends of the channel strips are clamped and prevent the ends from protruding upwards. At least one notch may be formed on the hook, which notch is engaged by a flexible sealing lip of the channel strip that advances inside the groove to anchor it in positive locking manner.

The wall thickness of the hook at the level of the notch should not be greater than the wall thickness of the top edge of the door outer skin, to ensure that the sealing lip that engages in the notch can also be secured by friction immediately beside the hook on the top edge of the door outer skin. To enable a positive locking catch mechanism of the channel strip over the entire length of the hook, the wall thickness of the hook should be greater than the wall thickness of the top edge of the door outer skin at least above the notch.

The channel strip may be form mostly or entirely by an extruded section, wherein a center part and a sealing lip of the extruded sections are co-extruded from different materials.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
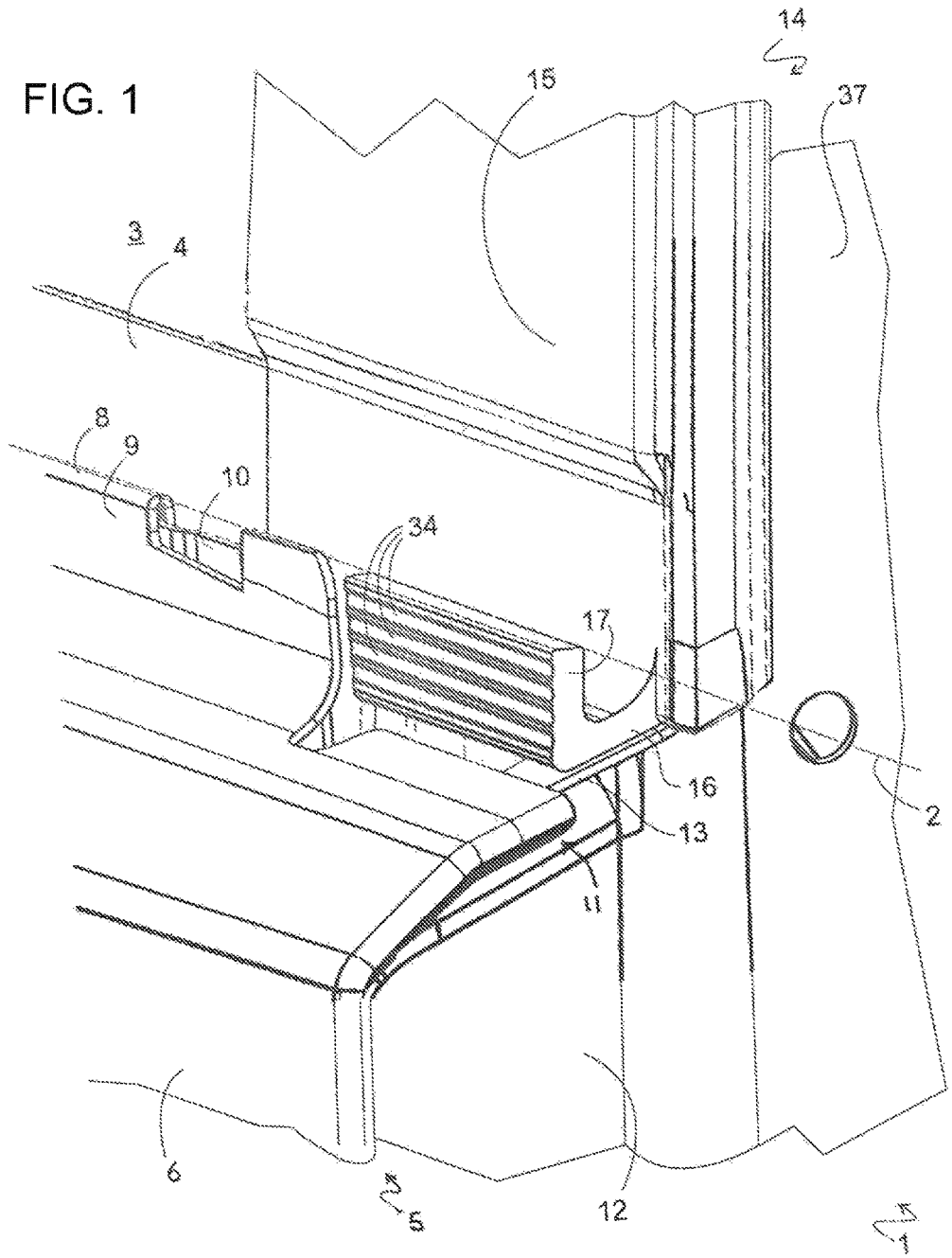
FIG. 1 is a perspective view of a detail of a vehicle door according to the present disclosure.

FIG. 1 shows a perspective view of a detail of a left side door of a motor vehicle, wherein it is understood that a symmetrically identical structure is also possible on the right side of the vehicle body. In particular, FIG. 1 shows an edge area of door 1 at the height of a waistline 2, located in the rear relative to the direction of travel of the vehicle and farthest from the hinge on the front edge of the door. A window opening 3 is shown here with a mostly lowered window pane 4 therein and a sheet metal outer skin 5 of door 1 border each other. Outer skin 5 is divided into an essentially vertically aligned main part 6, a shoulder 7 at the top edge of main part 6 which is angled towards the interior of the vehicle, and a flange 9 on the inner edge of shoulder 7 which projects upward as far as a top edge 8. The sheet metal of outer skin 5 forms a U-shape that is open at the bottom and surrounds an inner part 10 which is largely concealed in the figure behind outer skin 5.

A further beaded edge 11 on an edge of outer skin 5, which is located to the rear in the direction of travel, clasps a flange 13 on the edge of a rear front wall 12 that is angled in the opposite direction to the direction of travel and is nearly concealed in FIG. 1. Front wall 12 extends upwards to above waistline 2 to form a support center part 37 of a B pillar 14 that delimits the rear of window opening 3.

A panel 15 is hooked onto center part 37 of B pillar 14. The vertically elongated panel 15 extends for the full height of window opening 3. Panel 15 is an injection molded part made of plastic. A hook 16 is conformed on the bottom edge of panel 15. A free end of hook 16 forms a plate-shaped flange 17 which is elongated in the direction of travel to align flush with flange 9 of outer skin 5. Multiple flat notches 34 on an outer side of flange 17 that faces away from panel 15 extend parallel to top edge 8.

Flanges 9 and 16 are provided to support a channel strip 18, which is omitted from FIG. 1 to enable the details of the door structure to shown which would be concealed by it in the completed vehicle.

Figure 2:
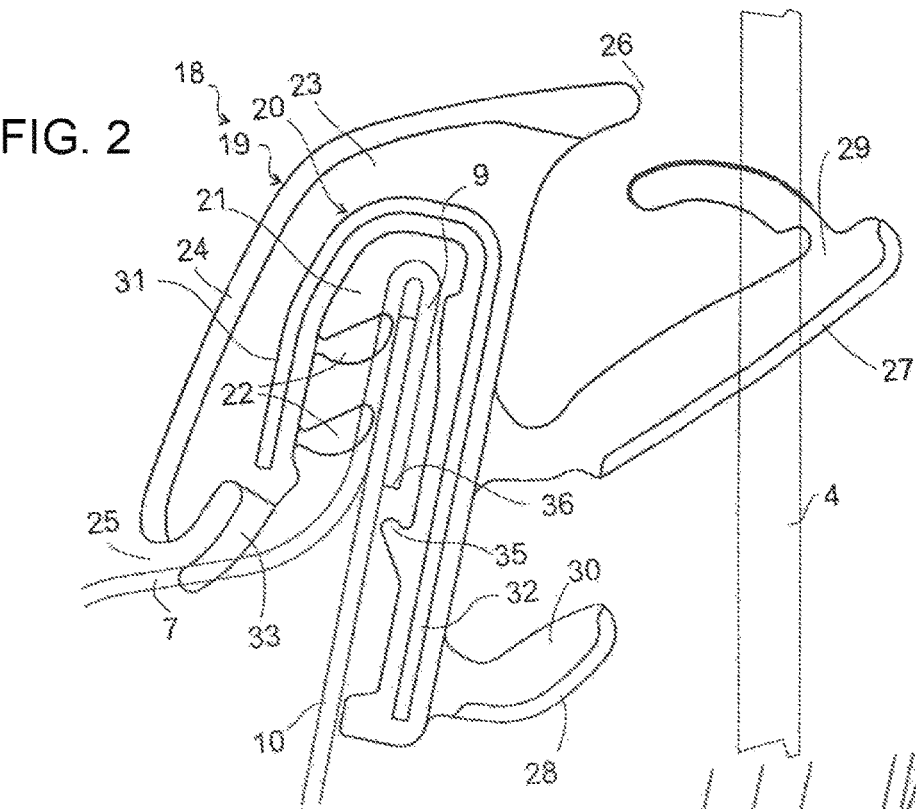
FIG. 2 is a cross-section through an area of the channel strip shown in FIG. 1, which is mounted on the enclosed top edge of the door outer skin.

FIG. 2 shows a cross section through a region of channel strip 18 which extends below window opening 3 and flange 9 which engages in a groove 21 in channel strip 18. Channel strip 18 includes a core 20 made from sheet steel or aluminium and may be slightly flexible if necessary, and an extruded section 19 made from polymer materials such as ethylene propylene diene terpolymer (EPDM) or thermoplastic elastomers (TPE) which surrounds core 20. Extruded section 19 includes zones with different material compositions. The zones include various materials which are optimized for their respective purposes are co-extruded with a center part 23 made from a relatively inexpensive, possibly somewhat rigid material. One of these zones forms a shell 24 which shields the center part 23 from sunlight and weather effects, and the bottom edge of which is separated from shoulder 7 by a narrow gap 25 and the top edge of which is separated from window pane 4 by a narrow gap 26. Two other areas 27, 28 on the sides of two sealing lips 29, 30 facing towards window pane 4 are layers of flock fibre, which are in contact with window pane 4 and ensure low-friction, low-noise movement of window pane 4. Sealing lips 29, 30 are co-extruded from a material that is more elastic than that of center part 23.

Core 20 has a U-shaped cross section, the legs 31, 32 of which are of unequal length and extend about a groove 21 in which flange 9 engages. A further sealing lip 33 is co-extruded with center part 23 to create an extension of the shorter leg 31, which is elastically deformed in contact with shoulder 7 and closes gap 25 in water-tight manner. Two retaining lips 22 are co-extruded on a side of groove 21 facing away from the passenger cabin, and are deflected upwards towards the floor of groove 21 by contact with flange 9. As retaining lips 22 press in frictionally locking manner against flange 9, they are compressed elastically in an upward movement of channel strip 18 and force channel strip 18 back into its resting position on the flange. A short, rigid lip 35 made from the same material as center part 23 locks behind a step 36, which in this case is formed by the edge of the outer skin 5 that surrounds inner part 10 in a U formation and prevents channel strip 18 from being pulled away upwards by flange 9.

Figure 3:
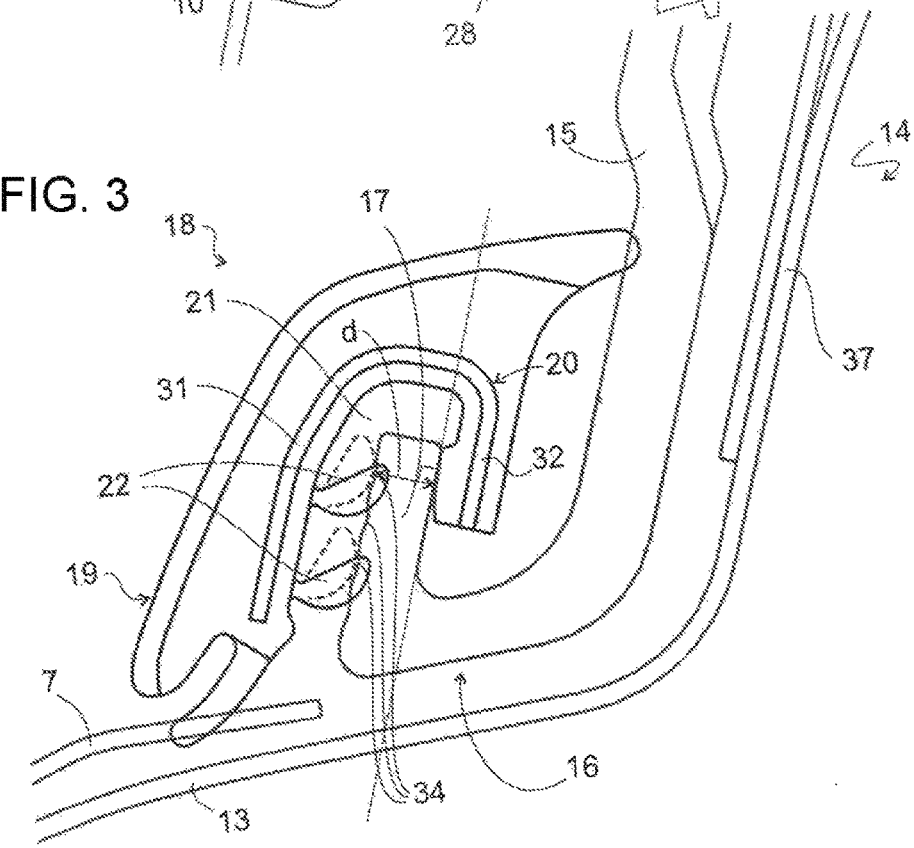
FIG. 3 is a cross-section through an area of the channel strip which is mounted on the hook.

The cross section in FIG. 3 is directed along a plane parallel to the plane of FIG. 2 through a rear end area of channel strip 18, flange 13 of front wall 12, center part 37 and panel 15 of B pillar 14 and hook 16. A part of the leg 32 facing the passenger cabin, the core 20 and the layer of the extruded section 19 that surrounds them are cut away here, so that the two sealing lips 29, 30 are missing here and the remaining portion of leg 32 is shorter than outer leg 31. The space created in this way is occupied by the hook 16 which is conformed on the bottom edge of panel 15; flange 17 thereof engages in groove 21 of channel strip 18 instead of flange 9.

The two retaining lips 22 of extruded section 19 are represented twice in FIG. 3, once with solid lines in the untensioned position, and once with dashed line in the position into which they are deflected by flange 17 when it is pushed into groove 21. In the deflected position, each retaining lip 22 engages in one of the notches 34 of flange 17. Accordingly, channel strip 18 can only be pulled away from flange 17 against the resistance of retaining lips 22, which are compressed by an upward movement of channel strip 18. The degree to which retaining lips 22 resist detachment of channel strip 18 from the flange may be set as needed with the aid of several parameters, such as the depth and shape of notches 34, the length and width of retaining lips 22. The distance between notches 34 is half of the distance between the retaining lips 22, on the one hand to create closely adjacent locking positions for the retaining lips 22, so that a water-tight contact between sealing lip 33 and shoulder 7 may be assured despite any tolerances in the positioning of panel 15 relative to shoulder 7, but on the other hand also to ensure that there is sufficient space to enable adequate resistance to pulling off of flange 17 due to substantial wall thickness of retaining lips 22.

Thickness d of flange 17 at the deepest point of the notches may be chosen to be the same as the wall thickness of flange 9, so that on one side sealing lips 22 can lie flush in friction-locking manner with flange 9 over the whole length thereof, until they are immediately adjacent to flange 17, and that on the other side they are also flush with the floor of notches 34 over the whole length thereof, and are thus able to create a secure form-fitting connection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle door comprising:
    a door outer skin having a top edge with a second flange, the top edge delimiting a bottom of a window opening;
    a pillar delimiting a side of the window opening;
    a hook that is attached to the pillar and that protrudes from the pillar, the hook including a first flange; and
    a channel strip having a groove that extends in a longitudinal direction;
    wherein the top edge of the door outer skin and the hook are arranged consecutively along the longitudinal direction with the first flange and the second flange aligned flush, the first flange and the second flange being received in consecutive sections of the groove of the channel strip in the longitudinal direction thereof.

2. The vehicle door according to claim 1, wherein the pillar comprises a supporting center part and a vertically elongated panel attached to the center part, wherein the hook is attached to the panel and protrudes away from the panel.

3. The vehicle door according to claim 2, wherein the hook comprises a molded plastic hook.

4. The vehicle door according to claim 3, wherein the hook and the panel comprise an integrally molded part.

5. The vehicle door according to claim 1, further comprising a door inner part, wherein the door outer skin surrounds the door inner part along the top edge.

6. The vehicle door according to claim 1, wherein the door outer skin surrounds a front wall of the door along a lateral edge.

7. The vehicle door according to claim 1, wherein a wall thickness of the hook is at least locally greater than a wall thickness of the top edge of the door outer skin.

8. The vehicle door according to claim 1, wherein the channel strip comprises a co-extruded section having a center part formed from a first material and a sealing lip formed from a second material different from the first material.

9. The vehicle door according to claim 1, wherein the pillar is a B-pillar of the vehicle door.

10. A vehicle door comprising:
   a door outer skin having a top edge, the top edge delimiting a bottom of a window opening;
   a pillar delimiting a side of the window opening;
   a hook that is attached to the pillar and that protrudes from the pillar, the hook comprising at least one notch formed therein; and
   a channel strip having a groove that extends in a longitudinal direction;
   wherein the top edge of the door outer skin and the hook are arranged consecutively along the longitudinal direction and are received in the groove of the channel strip.

11. The vehicle door according to claim 10, wherein the channel strip comprises a flexible sealing lip that protrudes into an interior of the groove of the at least one notch.

12. The vehicle door according to claim 11, wherein a first wall thickness of the hook at a height of the notch is less than or equal to a second wall thickness at the top edge of the door outer skin.

13. The vehicle door according to claim 11, wherein a first wall thickness of the hook above the notch is greater than a second wall thickness at the top edge of the door outer skin.

14. A vehicle door defining a longitudinal direction and configured to support a window pane, the vehicle door comprising:
   a door outer skin having a first flange that projects upward as far as a top edge, the top edge delimiting a bottom of a window opening for the window pane;
   a B-pillar that delimits a side of the window opening, the B-pillar including a support center part and a panel that is attached to the support center part, the panel including an integrally attached hook that projects from the panel, the hook including a second flange that is consecutively arranged along the longitudinal direction with the first flange, the second flange being aligned flush with the first flange, the second flange including a notch, a first wall thickness of the second flange at the notch being, at most, equal to a second wall thickness of the first flange; and
   a channel strip having a groove that extends in the longitudinal direction, the first flange and the second flange being received in the groove, the channel strip including a plurality of retaining lips that are elastically compressed against the first flange and against the second flange to retain the channel strip thereon, at least one of the plurality of retaining lips being received in the notch, the channel strip including a first sealing lip that seals against the door outer skin and a second sealing lip configured to seal against the window pane.

15. The vehicle door of claim 14, further comprising:
   a door inner part;
   wherein the door outer skin surrounds the door inner part and terminates at a step; and
   wherein the channel strip includes a rigid lip that is locked behind the step to retain the channel strip to the door outer skin.

* * * * *